US011143207B2

(12) United States Patent
Sun et al.

(10) Patent No.: US 11,143,207 B2
(45) Date of Patent: Oct. 12, 2021

(54) AXIAL THRUST LOADING MITIGATION IN A TURBOCHARGER

(71) Applicant: Ford Global Technologies, LLC, Dearborn, MI (US)

(72) Inventors: Harold Huimin Sun, West Bloomfield, MI (US); Leon Hu, Bloomfield Hills, MI (US); Dave R. Hanna, Troy, MI (US); Jianwen James Yi, West Bloomfield, MI (US); Eric Warren Curtis, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/513,572

(22) Filed: Jul. 16, 2019

(65) Prior Publication Data
US 2019/0338787 A1  Nov. 7, 2019

Related U.S. Application Data

(62) Division of application No. 14/928,743, filed on Oct. 30, 2015, now Pat. No. 10,415,599.

(51) Int. Cl.
*F04D 29/66* (2006.01)
*F04D 25/02* (2006.01)
(Continued)

(52) U.S. Cl.
CPC ............ *F04D 29/662* (2013.01); *F01D 3/00* (2013.01); *F02B 37/04* (2013.01); *F02B 37/10* (2013.01);
(Continued)

(58) Field of Classification Search
CPC ...... F04D 17/10; F04D 25/024; F04D 25/045; F04D 29/051; F04D 29/162;
(Continued)

(56) References Cited

U.S. PATENT DOCUMENTS 1,213,889 A * 1/1917 Lawaczeck ............... F04D 1/02
                                                      415/186
2,620,123 A  12/1952 Parducci
(Continued)

FOREIGN PATENT DOCUMENTS

CN  101663471 A  3/2010
CN  104105884 A  10/2014
(Continued)

OTHER PUBLICATIONS

National Intellectual Property Administration of the People's Republic of China, Office Action and Search Report Issued in Application No. 201610941828.6, dated Dec. 3, 2019, 10 pages. (Submitted with Partial Translation).
(Continued)

*Primary Examiner* — Jesse S Bogue
*Assistant Examiner* — Loren C Edwards
(74) *Attorney, Agent, or Firm* — Geoffrey Brumbaugh; McCoy Russell LLP

(57) ABSTRACT

Methods and systems are provided for a turbocharger system to reduce and balance axial thrust load on the turbine shaft and the associated bearing system and sealing. In one example, a partial back plate compressor may be used in combination with an axial turbine to reduce axial thrust load and to improve turbocharger transient response time. In another example, a regenerative turbocharger system with back-to-back turbo pump may be used to reduce and balance axial thrust load.

5 Claims, 14 Drawing Sheets

(51) Int. Cl.

| | | |
|---|---|---|
| *F04D 29/051* | (2006.01) | |
| *F02C 6/12* | (2006.01) | |
| *F01D 3/00* | (2006.01) | |
| *F02B 37/12* | (2006.01) | |
| *F02B 37/04* | (2006.01) | |
| *F02B 37/14* | (2006.01) | |
| *F02B 37/10* | (2006.01) | |
| *F02D 23/00* | (2006.01) | |
| *F04D 17/10* | (2006.01) | |
| *F04D 25/04* | (2006.01) | |
| *F04D 29/16* | (2006.01) | |
| *F01D 5/04* | (2006.01) | |
| *F04D 29/28* | (2006.01) | |

(52) U.S. Cl.
CPC .............. *F02B 37/12* (2013.01); *F02B 37/14* (2013.01); *F02C 6/12* (2013.01); *F02D 23/00* (2013.01); *F04D 17/10* (2013.01); *F04D 25/024* (2013.01); *F04D 25/045* (2013.01); *F04D 29/051* (2013.01); *F01D 5/048* (2013.01); *F04D 29/162* (2013.01); *F04D 29/284* (2013.01); *F05D 2220/40* (2013.01); *F05D 2260/15* (2013.01)

(58) Field of Classification Search
CPC ............ F04D 29/284; F01D 3/00–3/04; F01D 5/045; F01D 5/048; F02B 37/04; F02B 37/10; F03B 3/12–3/128; F03B 7/00; F03B 7/003; Y02T 10/12
See application file for complete search history.

(56) References Cited

U.S. PATENT DOCUMENTS

| | | | |
|---|---|---|---|
| 3,246,605 A * | 4/1966 | Fisher | F04D 1/006 415/90 |
| 4,060,337 A | 11/1977 | Bell, III | |
| 4,255,095 A | 3/1981 | Goulvestre et al. | |
| 4,396,347 A * | 8/1983 | Chang | F04D 25/024 415/175 |
| 4,502,837 A | 3/1985 | Blair et al. | |
| 4,653,976 A | 3/1987 | Blair et al. | |
| 4,761,947 A | 8/1988 | Hennecke et al. | |
| 5,113,658 A | 5/1992 | Kobayashi | |
| 5,238,367 A | 8/1993 | Ellis et al. | |
| 5,421,310 A | 6/1995 | Kapich | |
| 5,471,965 A | 12/1995 | Kapich | |
| 5,567,129 A | 10/1996 | Bonardi | |
| 5,697,767 A | 12/1997 | Bissell et al. | |
| 5,862,666 A | 1/1999 | Liu | |
| 5,924,286 A | 7/1999 | Kapich | |
| 6,035,627 A | 3/2000 | Liu | |
| 6,129,510 A * | 10/2000 | Martin | F01D 5/043 123/559.1 |
| 6,502,398 B2 | 1/2003 | Kapich | |
| 6,709,243 B1 | 3/2004 | Tan et al. | |
| 7,287,384 B2 | 10/2007 | Fish et al. | |
| 7,682,131 B2 | 3/2010 | Legare et al. | |
| 7,841,187 B2 | 11/2010 | Behaghel et al. | |
| 8,147,178 B2 | 4/2012 | Ottaviano et al. | |
| 2007/0196206 A1 | 8/2007 | Martin et al. | |
| 2008/0141679 A1 | 6/2008 | Behaghel et al. | |
| 2009/0015018 A1* | 1/2009 | Nail | F03B 3/125 290/55 |
| 2011/0041494 A1 | 2/2011 | Parker et al. | |
| 2012/0180482 A1 | 7/2012 | Kapich | |
| 2012/0198843 A1* | 8/2012 | Sun | F01K 27/005 60/608 |
| 2014/0123642 A1 | 5/2014 | Kim | |
| 2015/0013332 A1 | 1/2015 | Nasir et al. | |

FOREIGN PATENT DOCUMENTS

| | | |
|---|---|---|
| GB | 190911366 A | 10/1909 |
| JP | S59211795 A | 11/1984 |
| WO | 2015013100 A1 | 1/2015 |
| WO | 2015142517 A1 | 9/2015 |

OTHER PUBLICATIONS

National Property Administration of the People's Republic of China, Office Action and Search Report Issued in Application No. 201610941828.6, dated Aug. 25, 2020, 8 pages. (Submitted with Partial Translation).

\* cited by examiner

AXIAL THRUST LOADING MITIGATION IN A TURBOCHARGER

CROSS REFERENCE TO RELATED APPLICATION

The present application is a divisional of U.S. Non-Provisional patent application Ser. No. 14/928,743, entitled "AXIAL THRUST LOADING MITIGATION IN A TURBOCHARGER," and filed on Oct. 30, 2015. The entire contents of the above-referenced application are hereby incorporated by reference for all purposes.

FIELD

The present description relates generally to methods and systems for controlling thrust loading in a turbocharger.

BACKGROUND/SUMMARY

A turbocharger system operates to allow more power to be produced from an internal combustion engine. A turbocharger typically includes a turbine wheel and a compressor wheel mounted on a common turbine shaft. During operation, exhaust gas discharged from an exhaust manifold of the internal combustion engine drives the turbine wheel which rotates the turbine shaft at relatively high speed along with an associated thrust bearing system in the center housing of the turbocharger system. This rotational momentum and the input airflow subsequently rotates the mounted compressor wheel. The compressor then compresses the input air and provides compressed air at a boosted pressure to the inlet of the internal combustion engine, increasing the charge air density and hence amount of power that can be produced by the engine.

However, the inventors herein have recognized some issues with the above turbocharger system. A thrust load is generated on the turbine shaft due to the pressure imposed on the compressor and turbine's front and back faces. The back-faces of the compressor and the turbine generate maximum thrust, which causes axial loading of the shaft and increases friction loss of the contact seals and the associated thrust bearing system, reducing turbocharger durability and efficiency. Thrust loading may be particularly unbalanced in turbocharger systems that include axial turbines or an electric motor to drive the compressor.

Accordingly, a turbocharger system is provided herein to at least partly address the issue of the high pressure generated at the back-face of turbine wheels, which may cause excessive axial thrust load on the turbine shaft resulting in parasitic loss of the associated thrust bearing system. In one example, the turbocharger system comprises a centrifugal compressor including an impeller having a plurality of radiating blades coupled to a partial back plate. The partial back plate compressor has a plurality of cut-out sections. Each cut-out section is located between two respective radiating blades on an outer circumference of the impeller. The compressor is mounted on a shaft and coupled to a driver, mounted on the same shaft.

In this way, the high pressure at the back-face of the compressor is dissipated through the cut out sections from the back-face of the compressor to the front-face of the compressor, reducing axial thrust load on the shaft.

In another example, the above-described turbocharger system may include a regenerative turbocharger system including a back-to-back turbo pump with a back of a first impeller facing a back of a second impeller, a hydraulic turbine, a compressor, and a turbine, all mounted on a common shaft. The regenerative turbocharger system may generate thrust loading, exposing nearby seals to high pressure, and the inclusion of the back-to-back turbo pump may be used to generate balanced thrust load on the shaft.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
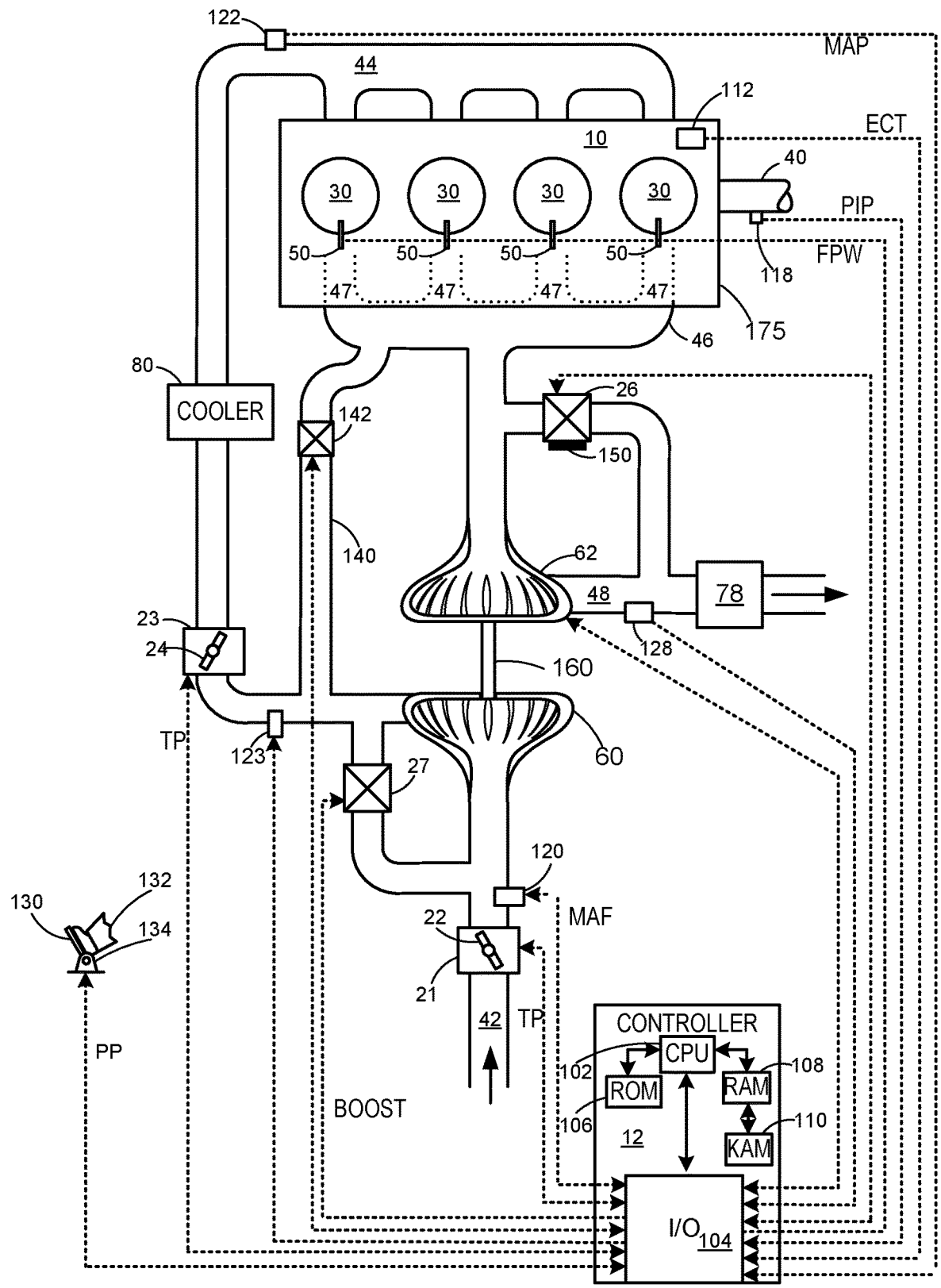
FIG. 1 illustrates a turbocharger system of an engine.
Figure 2:
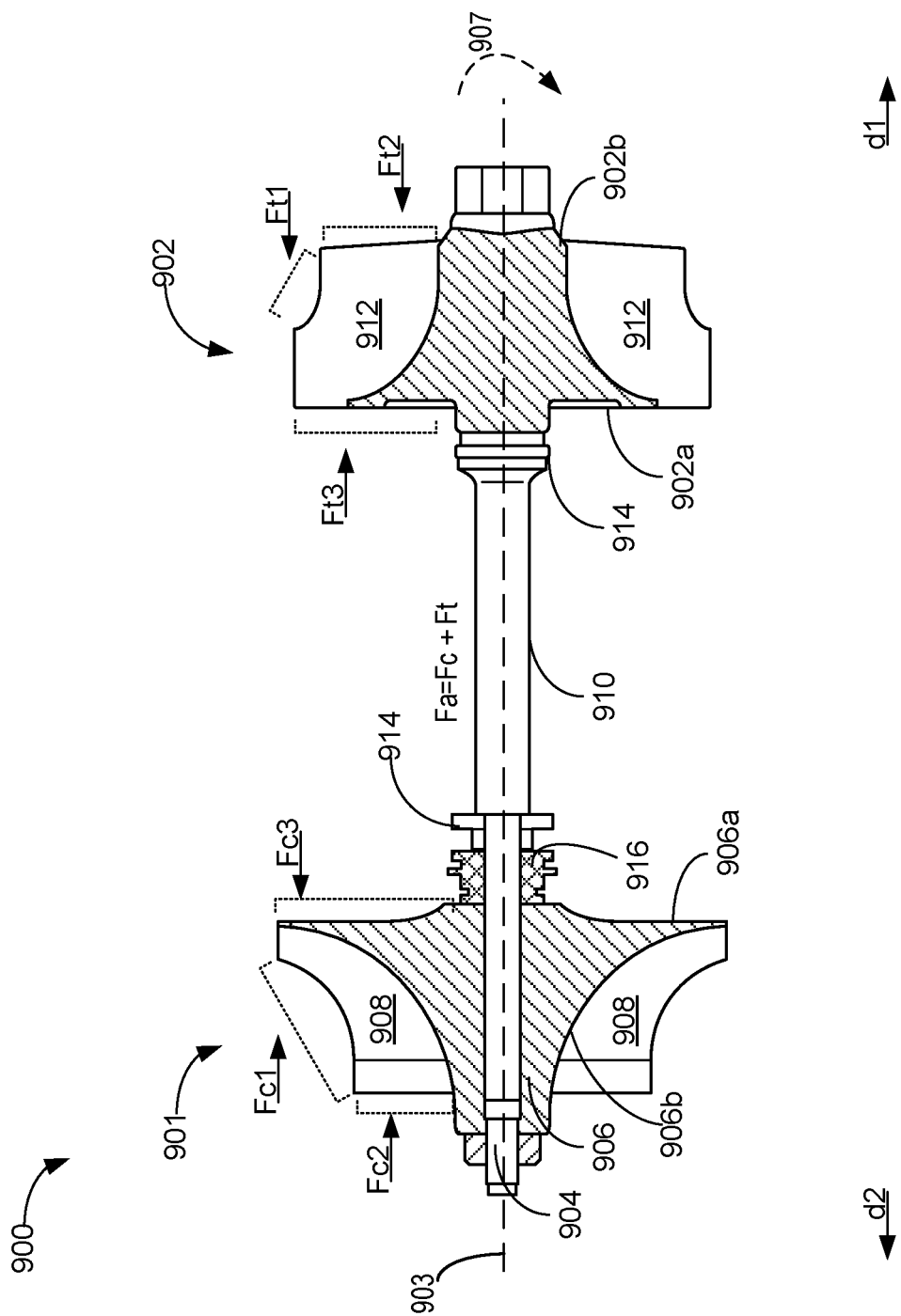
FIG. 2 shows the distribution of force in a turbocharger system contributing towards axial thrust loading of the turbine shaft.
Figure 3:
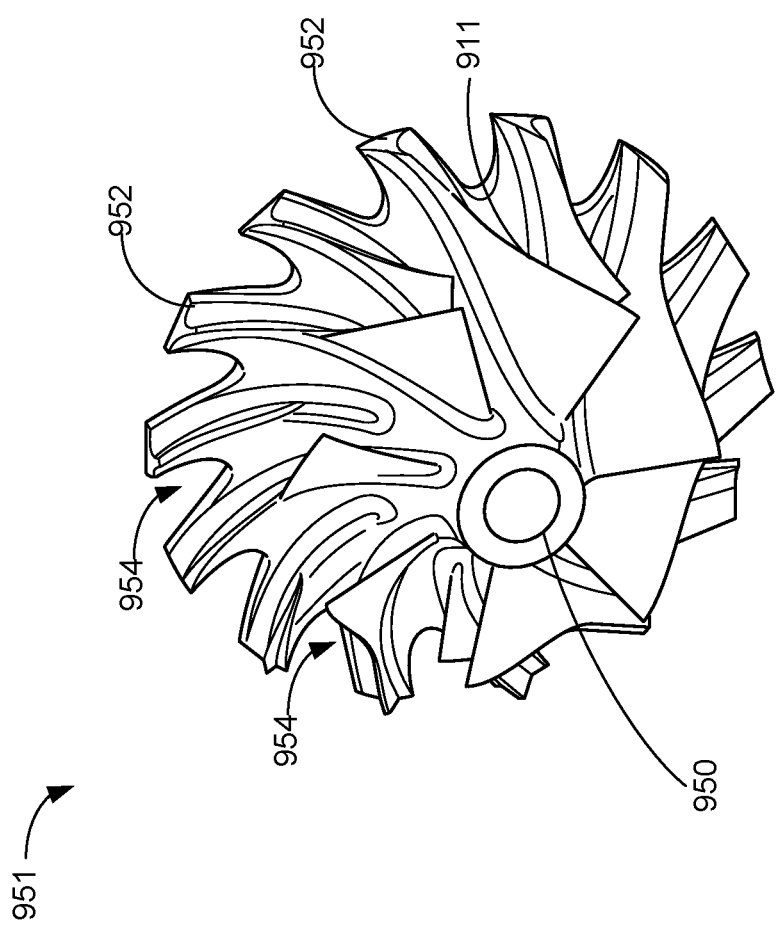
FIG. 3 is a perspective view of an impeller with a partial back plate.
Figure 4:
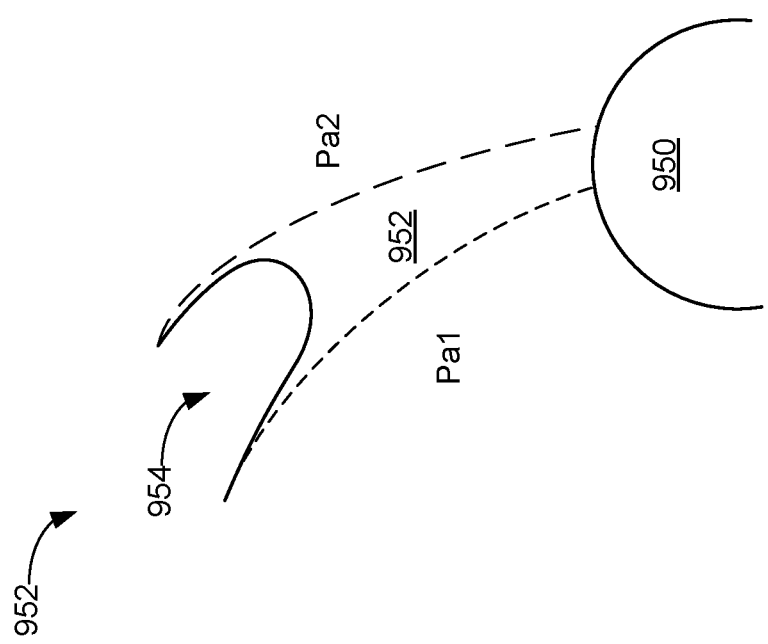
FIG. 4 shows the C-shape cut out near impeller outlet.
Figure 5:
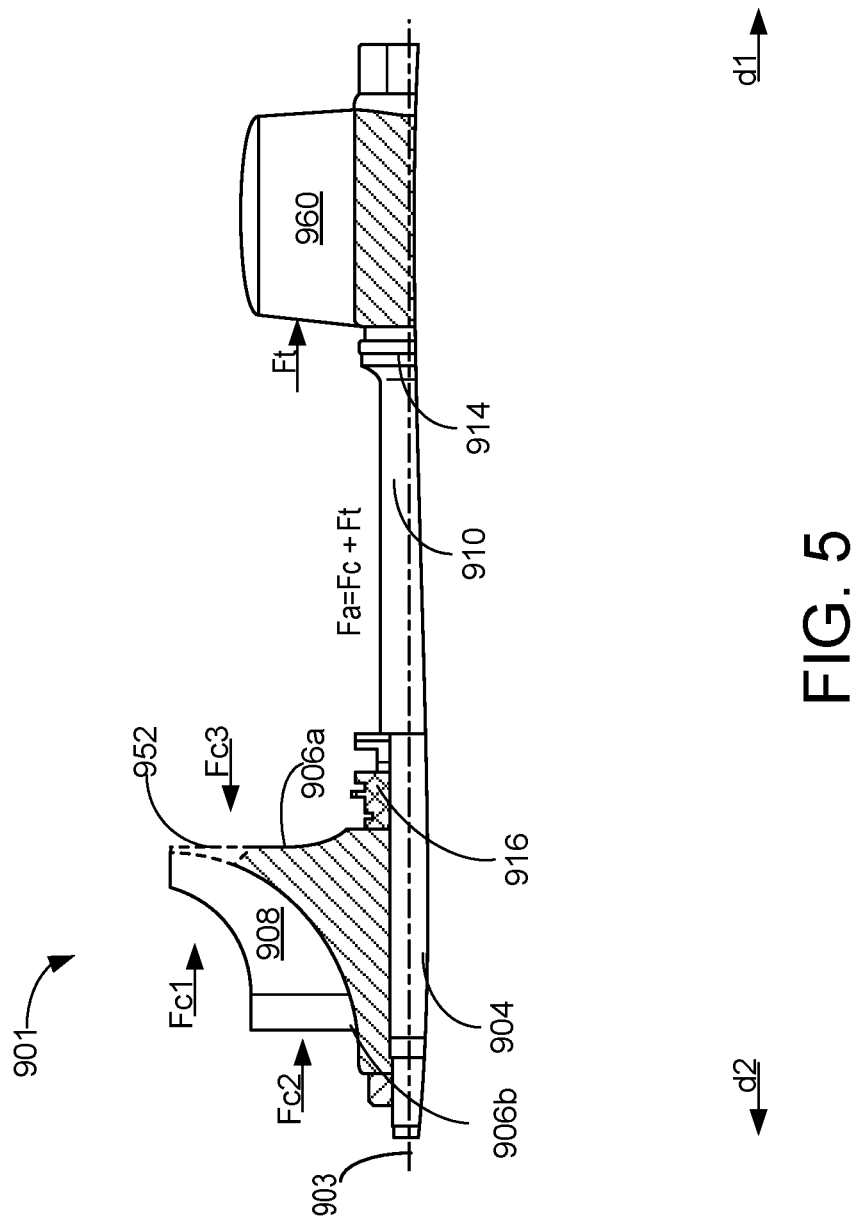
FIG. 5 illustrates the axial thrust load generated by a compressor with a partial back plate in combination with an axial turbine mounted on a turbine shaft.
Figure 6:
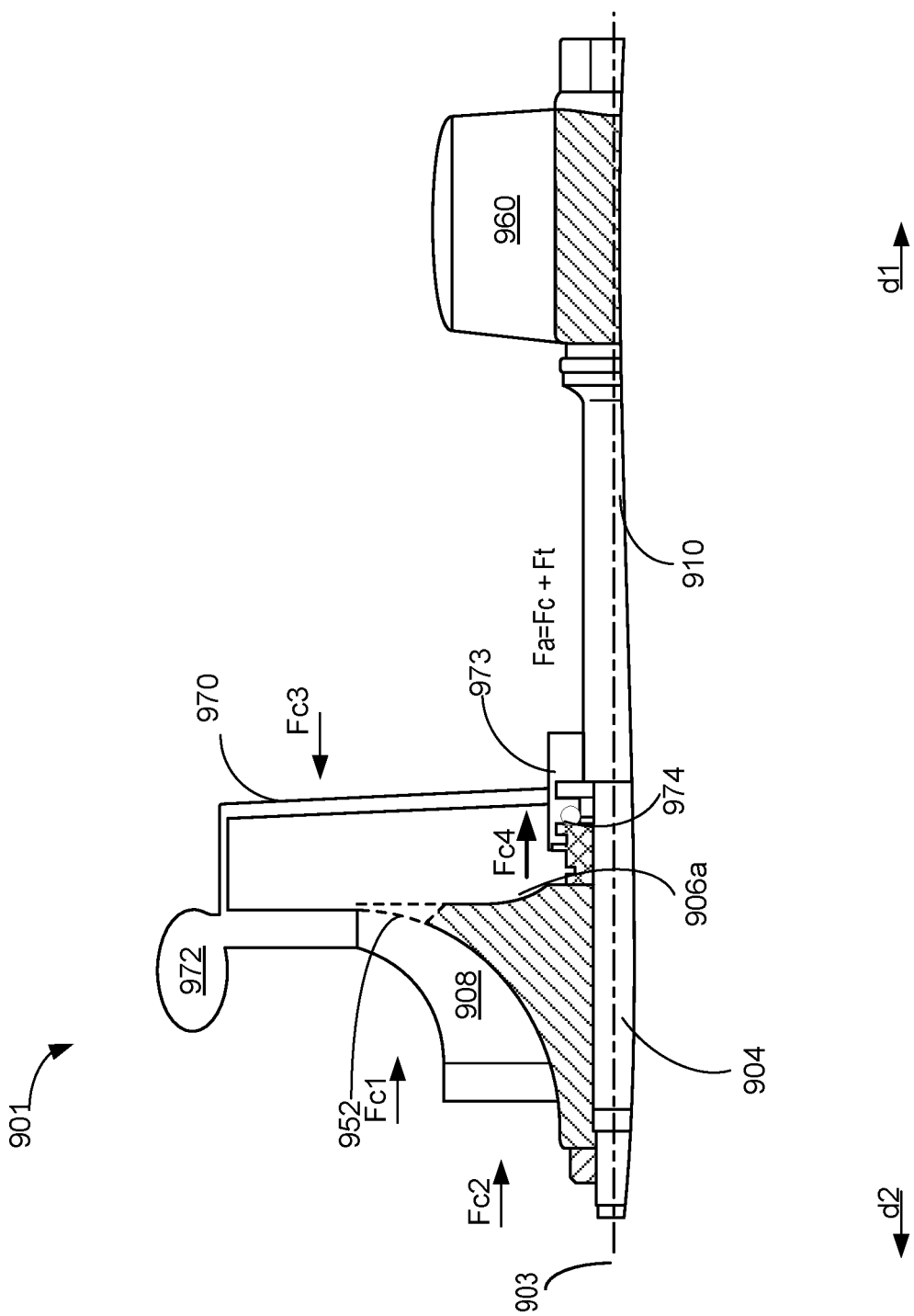
FIG. 6 depicts the axial thrust load generated by an axial turbine and a partial back plate turbo compressor with an attached auxiliary chamber.
Figure 7:
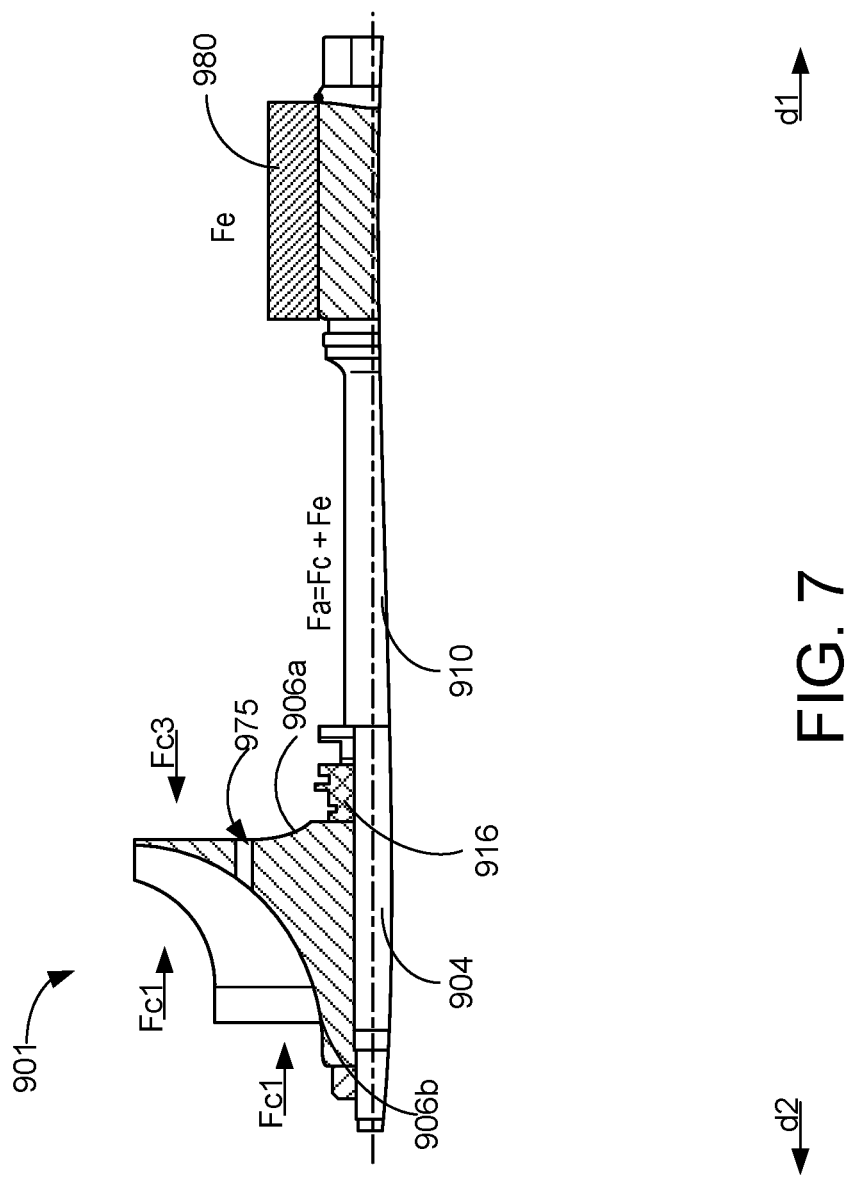
FIG. 7 illustrates the axial thrust load generated by an electric supercharger in combination with an impeller with holes to dissipate the force generated at the back-face of the impeller.

Force generated on the back-face of a compressor in a conventional turbocharger system can result in high axial thrust load on the shaft and on the associated sealing and thrust bearing system. This can result in parasitic loss and reduced turbocharger durability and efficiency. The following description relates to systems and methods for operating an engine including a turbocharger system, for example as shown in FIG. 1, to reduce the axial thrust load on the shaft of the turbocharger. The axial thrust load generated by a compressor and a turbine mounted on a turbine shaft of a turbocharger system is shown in FIG. 2. FIGS. 3-7 describe embodiments of a compressor to reduce the force generated at the back-face of the compressor. FIG. 3 is a perspective view of an impeller with a partial back plate. FIG. 4 shows C-shape cut out near impeller outlet. The axial thrust load generated by an impeller with partial back plate is shown in FIG. 5. FIG. 6 depicts axial thrust generation in a partial back plate compressor with an attached auxiliary chamber with a rotating disk. FIG. 7 illustrates an impeller with holes to dissipate the force generated at the back-face of the impeller. In one example, a passage may connect and introduce the high pressure from the compressor outlet area into a small chamber with a small mounted disk, inside a center housing, to generate a counter force to reduce the net axial thrust generated by the compressor. In another example, one or more small holes on the impeller connecting the back-face of the compressor with the front-face of the compressor dissipate the pressure on the back-face of the compressor, further reducing the axial force generated by the compressor wheel.

Figure 8:
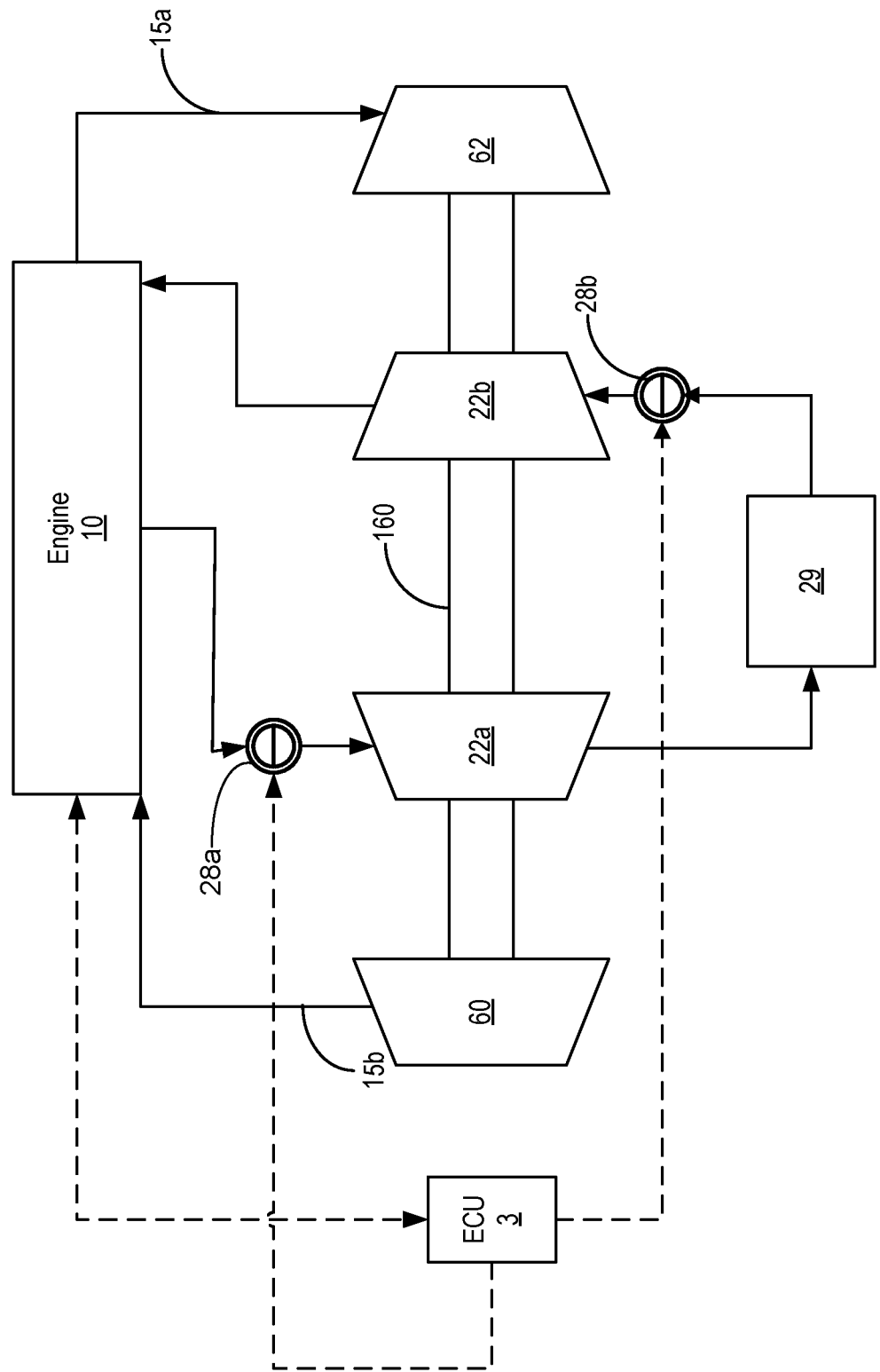
FIG. 8 shows a turbocharger system with additional pump and turbine wheel mounted on the turbine shaft.
Figure 9:
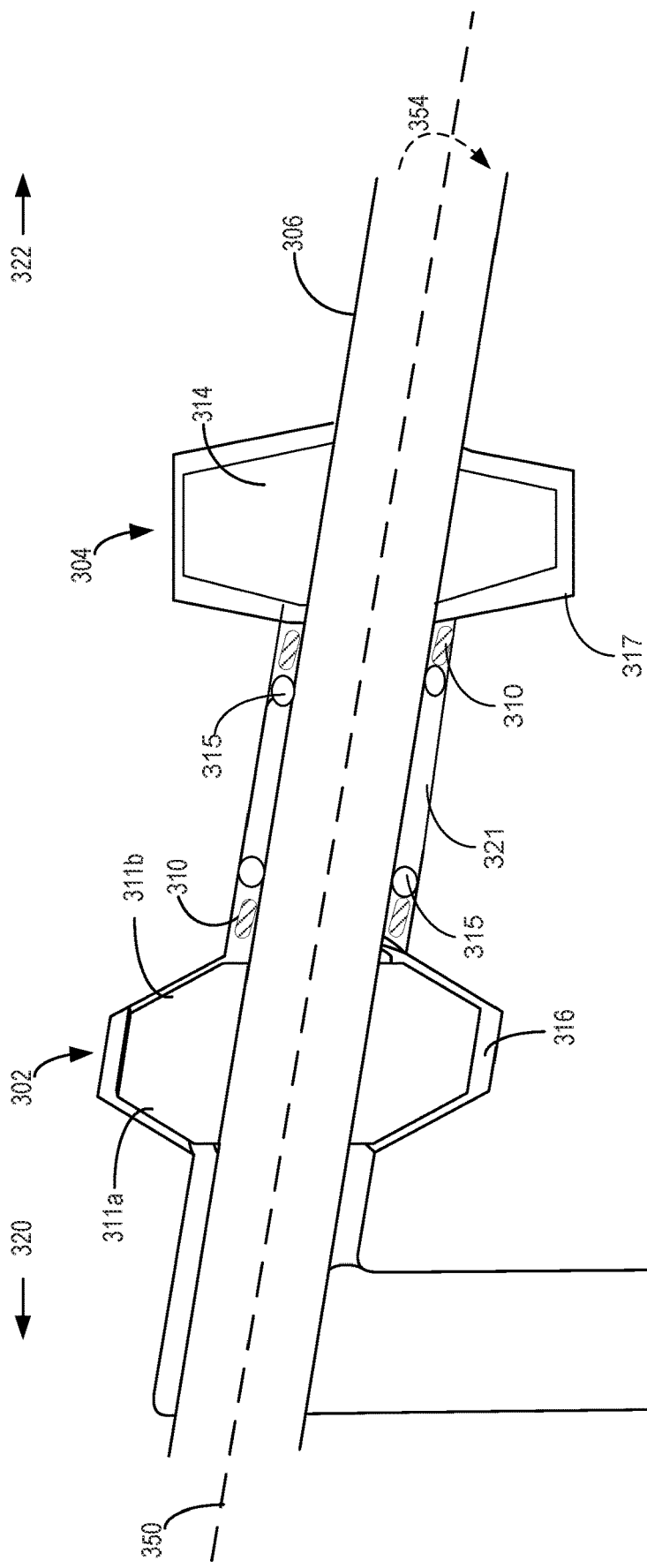
FIG. 9 is a schematic illustrating a turbocharger system with an additional back-to-back hydraulic turbine and a back-to-back turbo pump mounted on a turbocharger shaft.
Figure 10:
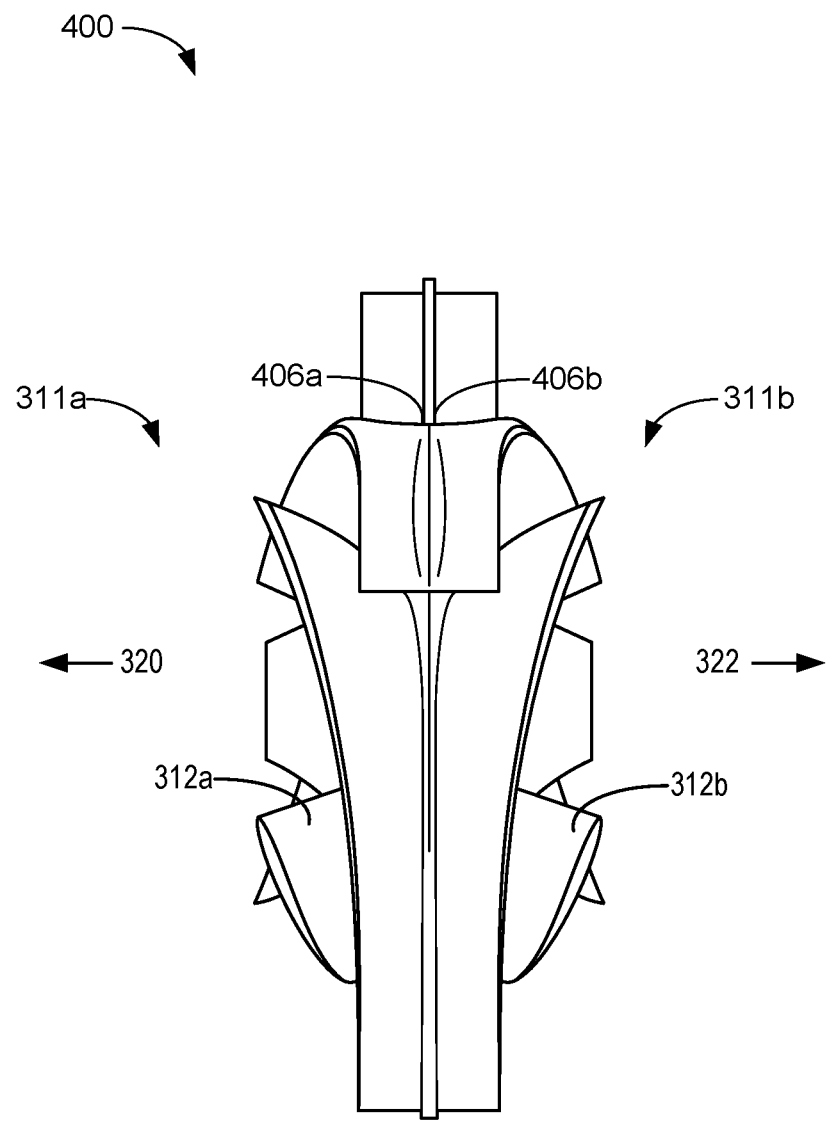
FIG. 10 shows the side view of a back-to-back impeller with impeller blades.
Figure 11:
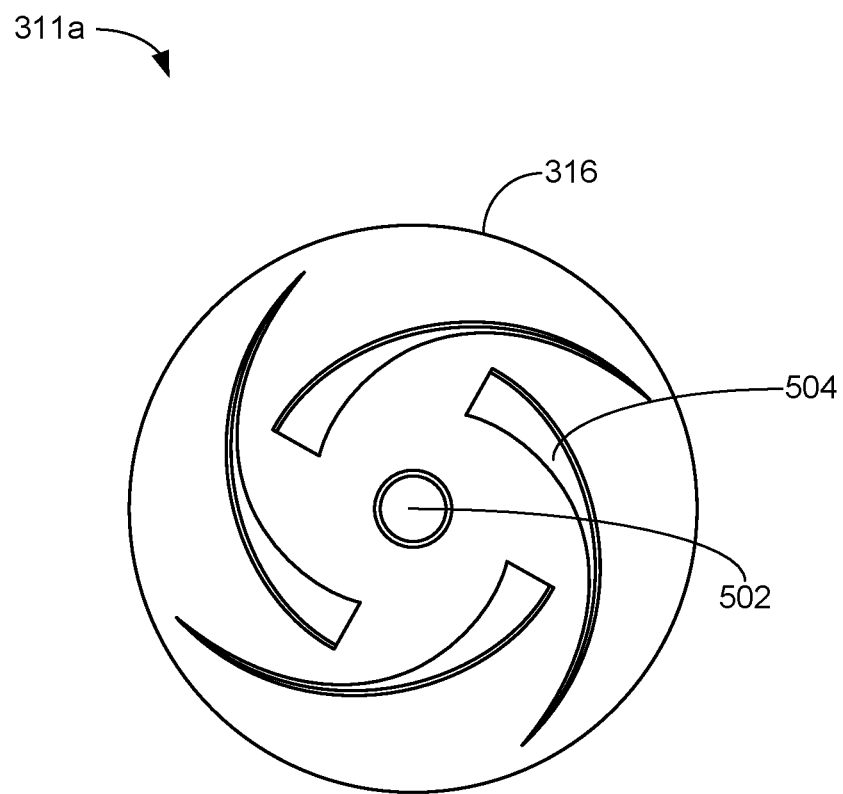
FIG. 11 shows the front view of an impeller.
Figure 12:
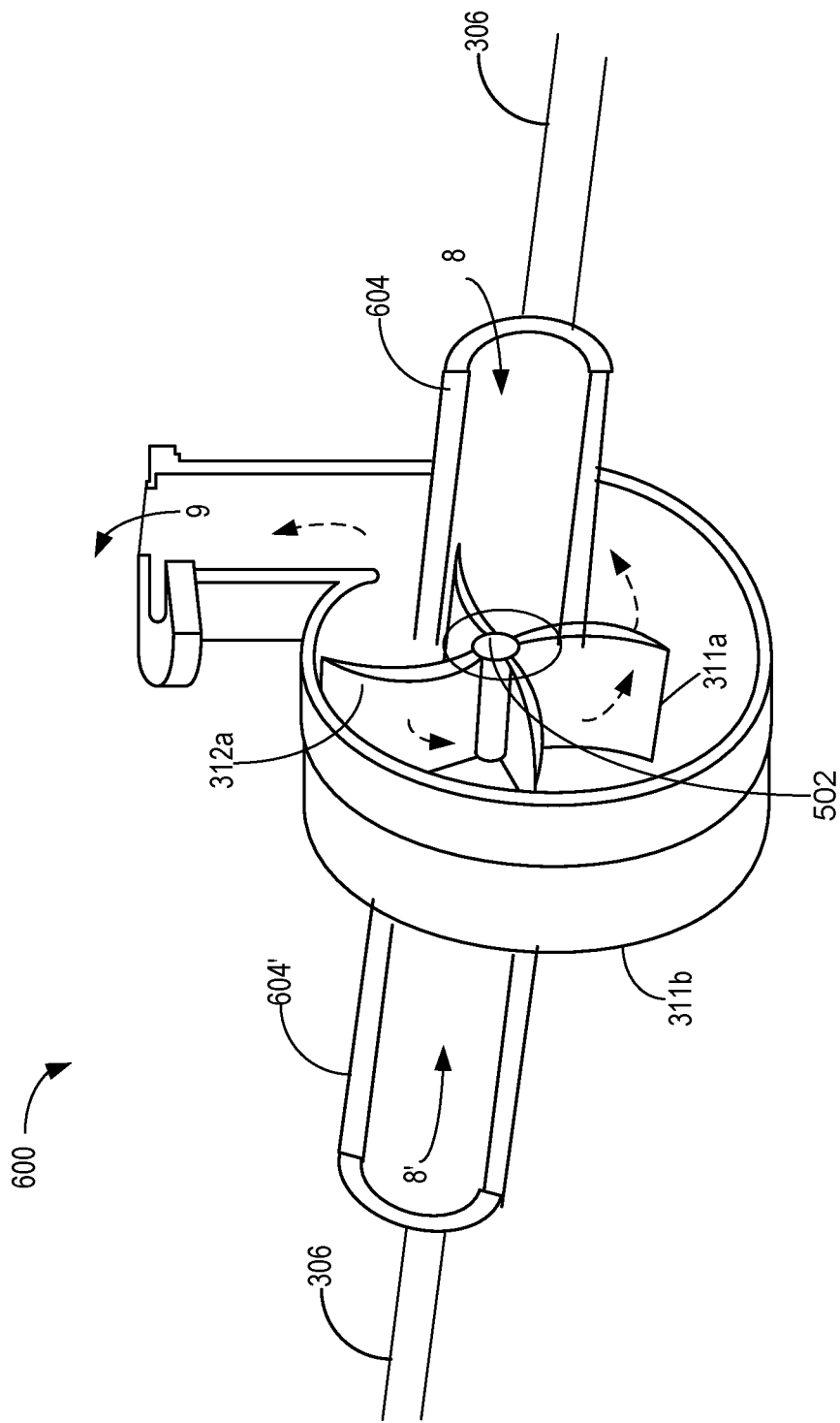
FIG. 12 shows a back-to-back impeller with two inlets and one discharge outlet.
Figure 13:
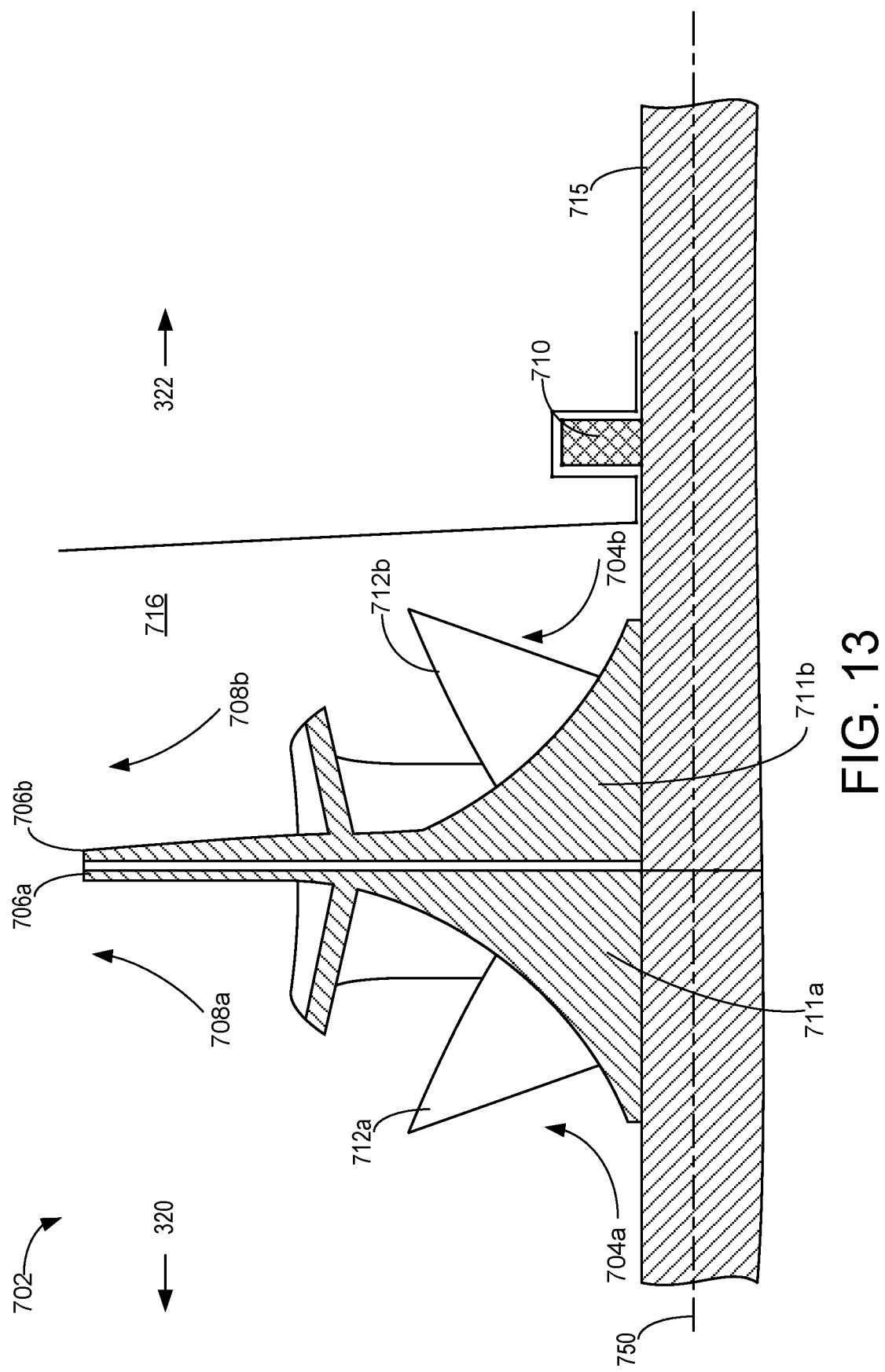
FIG. 13 is a schematic of a turbo pump with back-to-back impellers mounted on a turbine shaft.
Figure 14:
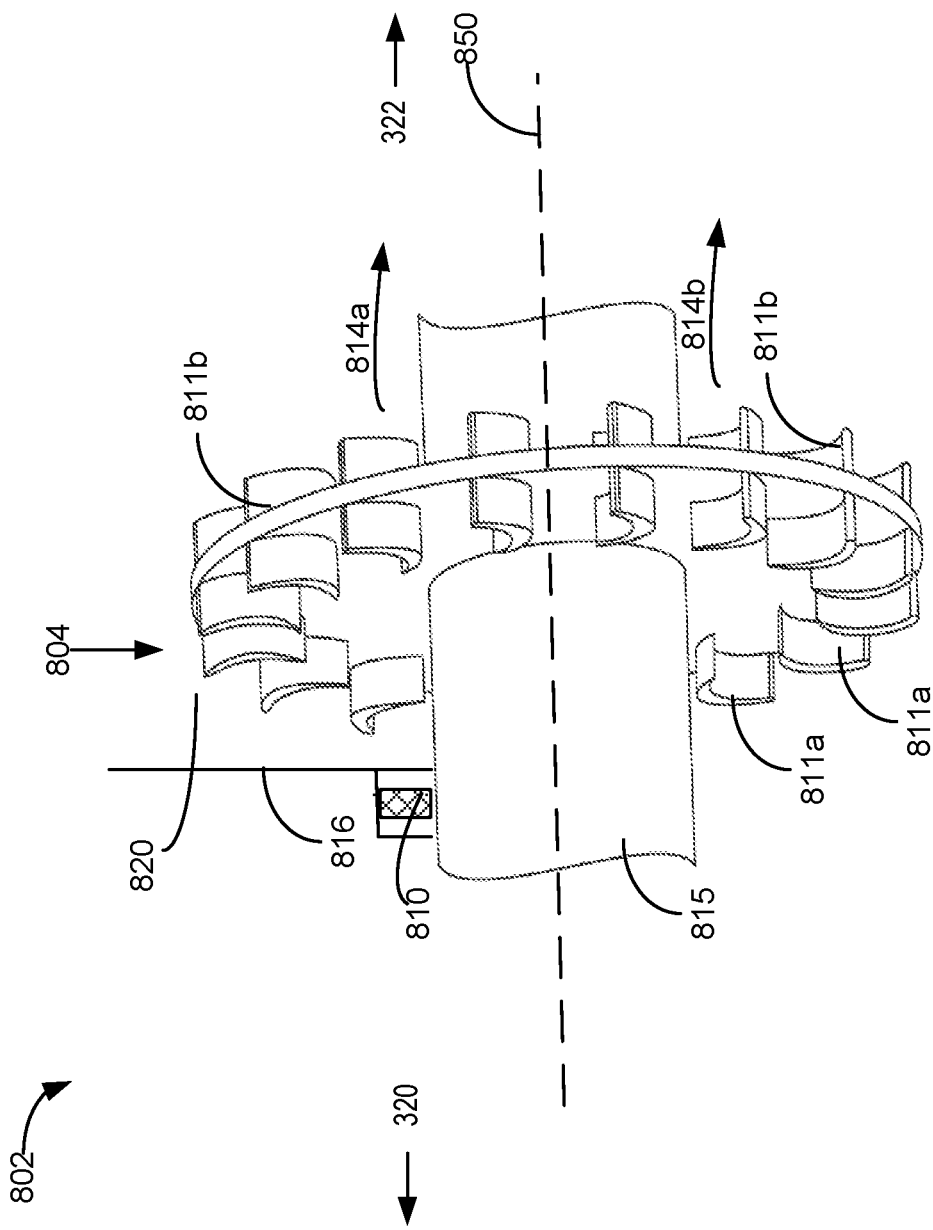
FIG. 14 is a schematic of a back-to-back hydraulic turbine mounted on a turbine shaft.

In a turbocharger system with an additional regenerative turbo pump and/or turbine, the turbine shaft sealing may be exposed to the high pressure at the back-face of the additional wheels mounted on the shaft. FIG. 8 shows a turbocharger system with an additional regenerative hydraulic turbo pump and hydraulic turbine mounted on the turbine shaft of a conventional turbocharger. To protect the sealing on a turbine shaft from the high pressure on the back-face of the additional turbo pump and the hydraulic turbine, a back-to-back turbo pump and a back-to-back hydraulic turbine may be mounted on the turbine shaft, as shown in FIG. 9. FIGS. 10 and 11 show the side view of back-to-back impellers and the front view of an impeller, respectively. FIG. 12 shows back-to-back impeller with two inlets and one discharge outlet. FIG. 13 shows a back-to-back turbo pump mounted on a turbine shaft and FIG. 14 shows a schematic of a back-to-back hydraulic turbine mounted on a turbine shaft.

FIG. 1 is a schematic diagram showing an example engine 10, which may be included in a propulsion system of an automobile. The engine 10 includes cylinder head 175, which is shown with four cylinders 30. However, other numbers of cylinders may be used in accordance with the current disclosure. Engine 10 may be controlled at least partially by a control system including controller 12, and by input from a vehicle operator 132 via an input device 130. In this example, input device 130 includes an accelerator pedal and a pedal position sensor 134 for generating a proportional pedal position signal PP. Each combustion chamber (e.g., cylinder) 30 of engine 10 may include combustion chamber walls with a piston (not shown) positioned therein. The pistons may be coupled to a crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel to enable a starting operation of engine 10.

Combustion chambers 30 may receive intake air from intake manifold 44 via intake passage 42 and may exhaust combustion gases via exhaust passage 48. Intake manifold 44 and exhaust manifold 46 can selectively communicate with combustion chamber 30 via respective intake valves and exhaust valves (not shown). In some embodiments, combustion chamber 30 may include two or more intake valves and/or two or more exhaust valves.

Fuel injectors 50 are shown coupled directly to combustion chamber 30 for injecting fuel directly therein in proportion to the pulse width of signal FPW received from controller 12. In this manner, fuel injector 50 provides what is known as direct injection of fuel into combustion chamber 30. The fuel injector may be mounted in the side of the combustion chamber or in the top of the combustion chamber, for example. Fuel may be delivered to fuel injector 50 by a fuel system (not shown) including a fuel tank, a fuel pump, and a fuel rail. In some embodiments, combustion chambers 30 may alternatively, or additionally, include a fuel injector arranged in intake manifold 44 in a configuration that provides what is known as port injection of fuel into the intake port upstream from each combustion chamber 30.

Intake passage 42 may include throttle 21 and 23 having throttle plates 22 and 24, respectively. In this particular example, the position of throttle plates 22 and 24 may be varied by controller 12 via signals provided to an actuator included with throttles 21 and 23. In one example, the actuators may be electric actuators (e.g., electric motors), a configuration that is commonly referred to as electronic throttle control (ETC). In this manner, throttles 21 and 23 may be operated to vary the intake air provided to combustion chamber 30 among other engine cylinders. The position of throttle plates 22 and 24 may be provided to controller 12 by throttle position signal TP. Intake passage 42 may further include a mass air flow sensor 120 and a manifold air pressure sensor 122 for providing respective signals MAF (mass airflow) and MAP (manifold air pressure) to controller 12.

Exhaust passage 48 may receive exhaust gases from cylinders 30. Cylinders 30 may be coupled to exhaust passage 48 through a plurality of valves and ports. The plurality of valves may open to allow exhaust to exit cylinders 30 and enter exhaust ports 47, which further direct exhaust gas to exhaust passage 48. In the example depicted in FIG. 1, the exhaust ports 47 are located inside of cylinder head 175. It will be appreciated that such a conformation may be referred to as an "integrated exhaust manifold" wherein exhaust manifold 46 is located inside cylinder head 175.

Exhaust gas sensor 128 is shown coupled to exhaust passage 48 upstream of emission control device 78. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO, a NOx, HC, or CO sensor, for example. Emission control device 78 may be a three way catalyst (TWC), NOx trap, various other emission control devices, or combinations thereof. Exhaust temperature may be measured by one or more temperature sensors (not shown) located in exhaust passage 48. Alternatively, exhaust temperature may be inferred based on engine operating conditions such as speed, load, air-fuel ratio (AFR), spark retard, etc.

Controller 12 is shown in FIG. 1 as a microcomputer, including microprocessor unit 102, input/output ports 104, an electronic storage medium for executable programs and calibration values shown as read-only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses for each revolution of the crankshaft 40. In some examples, storage medium read-only memory 106 may be programmed with computer readable data representing instructions executable by processor 102 for performing the methods described below as well as other variants that are anticipated but not specifically listed.

Engine 10 may further include a compression device such as a turbocharger or supercharger including at least a compressor 60 arranged upstream of intake manifold 44. For a turbocharger, compressor 60 may be at least partially driven by a turbine 62, via, for example shaft 160, or other coupling arrangement. The turbine 62 may couple exhaust manifold 46 to exhaust passage 48, for example via an integrated exhaust manifold, as described above. Various arrangements may be provided to drive the compressor. For a supercharger, compressor 60 may be at least partially driven by the engine and/or an electric machine, and may not include a turbine. Thus, the amount of compression provided to one or more cylinders of the engine via a turbocharger or supercharger may be varied by controller 12. In some cases, the turbine 62 may drive, for example, an electric generator, to provide power to a battery via a turbo driver. Power from the battery may then be used to drive the compressor 60 via a motor. Further, a sensor 123 may be disposed in intake manifold 44 for providing a BOOST signal to controller 12.

Further, exhaust passage 48 may include wastegate 26 for diverting exhaust gas away from turbine 62. In some embodiments, wastegate 26 may be a multi-staged wastegate, such as a two-staged wastegate with a first stage configured to control boost pressure and a second stage configured to increase heat flux to emission control device 78. Wastegate 26 may be operated with an actuator 150, which, for example, may be an electric actuator including permanent magnets. In various embodiments, actuator 150 may be an electric motor, a pressure controlled actuator or a vacuum controlled actuator. Intake passage 42 may include a compressor bypass valve 27 configured to divert intake air around compressor 60. Wastegate 26 and/or compressor bypass valve 27 may be controlled by controller 12 via actuators (e.g., actuator 150) to be opened when a lower boost pressure is desired, for example.

Intake passage 42 may further include charge air cooler (CAC) 80 (e.g., an intercooler) to decrease the temperature of the turbocharged or supercharged intake gases. In some embodiments, charge air cooler 80 may be an air to air heat exchanger. In other embodiments, charge air cooler 80 may be an air to liquid heat exchanger.

An exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Further, an EGR sensor (not shown) may be arranged within the EGR passage and may provide an indication of one or more of pressure, temperature, and concentration of the exhaust gas. Alternatively, the EGR may be controlled through a calculated value based on signals from the MAF sensor (upstream), MAP (intake manifold), MAT (manifold gas temperature) and the crank speed sensor. Further, the EGR may be controlled based on an exhaust $O_2$ sensor and/or an intake oxygen sensor (intake manifold). Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger.

FIG. 2 shows the turbocharger system of FIG. 1 and describes the forces generated at different aspects of the turbocharger when the turbine and compressor are engaged, for example, when engine exhaust flows through the turbine. In a turbocharger system, as the compressor wheel rotates, force is generated based on mass and acceleration of air at different aspects of the compressor blades, which contributes to generate axial load on the turbine shaft. Similarly, the air flow and pressure differential distributed on the front and back face of the turbine also generates axial thrust load on the shaft. A bearing system is mounted on the turbine shaft to absorb the axial thrust load on the shaft but excessive and/or unbalanced axial load can result in friction loss, damaging the thrust bearings on the turbine shaft. Thus, it may be desirable to maintain axial thrust load at low levels to diminish friction loss.

FIG. 2 shows a turbocharger system 900 along its longitudinal axis 903 which experiences an axial thrust load $F_a$ generated on a turbine shaft 904. A compressor 901 and a radial turbine 902 are mounted on the turbine shaft 904. The compressor 901 has an impeller 906 with a back-face 906*a* and a front-face 906*b* and a plurality of radiating impeller blades 908. In one example, the radially arranged blades may be full blades, each blade extending the full length of the flow passage from the inlet to the outlet. In another example, a plurality of splitter blades shorter in length than the full length blades may be present in combination with full blades. The turbine 902 with a back-face 902*a* and a front-face 902*b*, and a plurality of rotating blades 912 is also mounted on the turbine shaft 904. The back-face 906*a* of the compressor impeller faces the back-face 902*a* of the turbine. The shaft 904 is housed in a center housing 910. Seals 916 seal the center housing 910 and prevent the hydraulic fluid from leaking out of the center housing.

Turbocharger thrust bearings are provided in turbochargers to support a turbocharger shaft and enable rotation of the shaft. Thrust bearings 914 are mounted on the shaft 904 to absorb the axial thrust load $F_a$, generated by the turbocharger system on the shaft 904 as it rotates along a rotational axis 907 driven by the turbocharger system coupled to the engine. In one example, the thrust bearing may be rolling-contact type bearings, wherein rollers or ball bearings enable shaft rotation and absorb the axial load on the shaft.

The total axial thrust load $F_a$ is a combination of the net compressor force $F_c$ and the net turbine force $F_t$, acting on the turbine shaft 904. $F_c$ indicates the net force generated by the compressor 901 and $F_t$ indicates the net force generated by the turbine 902. The net compressor force $F_c$ is comprised of $F_{c1}$, $F_{c2}$ and $F_{c3}$, which further indicate the force generation at specific surfaces (marked by brackets with dotted lines) of the compressor 901, wherein $F_{c1}$ and $F_{c2}$ are forces generated in the first direction d1 at the front-face of the impeller 906*b* and $F_{c3}$ is force generated at the back-face of the compressor impeller 906*a* in a second direction d2, opposite to the first direction d1. Similarly, the net turbine force $F_t$ comprises $F_{t1}$, $F_{t2}$, and $F_{t3}$. $F_{t1}$ and $F_{t2}$ are the forces generated at the a back-face of turbine 902b in the second direction d2 and $F_{t3}$ is the force generated at the back-face of the turbine 902a, towards the first direction d1. $F_{c3}$, the force generated at the back-face of the compressor 906a, is greater than the combined forces $F_{c1}$ and $F_{c2}$ generated at the front-face of the compressor 906b, such that the net thrust $F_c$ generated by the compressor 901 is in direction d2. Similarly, the force $F_{t3}$ at the back-face of the turbine 902a is greater than combined forces $F_{t1}$ and $F_{t2}$ at the front-face of the turbine 902b such that the net turbine thrust $F_t$ is in direction d1. In one example, the net axial load $F_a$ may be very small or insignificant if $F_c$ in direction d2 is balanced or almost balanced by $F_t$ in direction d1. In examples where the turbine is an axial turbine, $F_c$ may be significantly larger than $F_t$.

In axial turbines, the rotor inlet and rotor outlet have similar radius and the impinging fluid/air is moved parallel to the turbine impeller, along the entire turbine wheel, generating minimal axial thrust load on the turbine shaft. In radial turbines the rotor inlet radius is less than the rotor outlet radius and the air is moved perpendicular to the impeller from one side of the wheel and then around the perimeter of the wheel, resulting in higher axial thrust generation compared to an axial turbine. Compared to radial turbines, axial turbines have inherently lower moment of inertia as they have lower mass, which can improve turbocharger transient response time. Turbocharger transient response time is the time taken by the turbocharger to respond to the demand for increased power by the engine. Axial turbines with lower inertia produce a smaller axial force $F_t$ along the turbine shaft, less that the force $F_c$ produced by the compressor. Thus, combining a conventional compressor with an axial turbine can result in unbalanced axial load $F_a$ on the shaft, resulting in friction loss of the associated bearing system.

In another example, the compressor may be coupled with an electric supercharger to increase transient response time. The electric supercharger generates minimal axial thrust load, resulting in unbalanced force $F_c$ causing axial thrust loading on the shaft. In order to use a compressor in combination with an axial turbine or an electric supercharger to improve transient response time, the force $F_c$ generated by the compressor needs to be reduced to balance the smaller force $F_t$ generated by the axial turbine or the electric supercharger.

According to embodiments disclosed herein, the net force $F_c$ generated by the compressor and the force $F_{c3}$ at the back-face of the compressor 906a may be reduced by a partial back plate compressor. The force generated at the back-face of the compressor is determined by the back-face area and the pressure at the back-face of the compressor. In a partial back plate compressor, the back-face area is reduced and the pressure at the back-face of the compressor is dissipated from the back-face to the front-face of the compressor, resulting in reduced force generation at the back-face the compressor. FIG. 3 shows a partial back plate impeller and FIG. 4 shows C-shape cut out near impeller outlet. FIG. 5 illustrates force distribution in a partial back plate compressor. The partial back plate compressor when combined with a passage connecting and transferring the high pressure from the outlet of the compressor to a chamber near the turbine shaft can further reduce the force generated by the compressor, as shown in FIG. 6. FIG. 7 illustrates a compressor with holes to dissipate the force at the back-face of the compressor to the front-face of the compressor, reducing the high pressure generated in the back-face of the compressor.

The force generated in the back-face of the compressor is determined by the by the back-face surface area A and by the pressure P at the back-face of the compressor (Fc3=P*A). In a partial back plate compressor, the total back-face area A is reduced and there is dissipation of pressure P through the partial back-face of the compressor to the front-face of the compressor. Referring to FIG. 3, an embodiment of a compressor impeller 951 with a partial back plate is shown. The compressor impeller 951 includes of a shaft hub 950, and a plurality of impeller blades 911 radially arranged around the shaft hub 950. The impeller 951 has a partial back plate 952, instead of a full back plate as seen in conventional compressors. The partial back plate 952 has C-shaped cut-out sections 954 on its outer circumference. The C-shaped cut-out sections 954 are positioned such that each section is located between respective radiating blades 911, forming a scalloped surface along the outer circumferential edge of the impeller. The C-shape cut-outs 954 on the partial back plate 952 are located away from the central shaft hub 950, and towards the impeller housing.

The partial plate impeller described above is able to decrease the back-face area A and to dissipate the pressure P at the back-face through the C-shape cut-outs, both contributing to reduce the fore $F_{c3}$ at the back-face of the compressor. In one embodiment, the C-shape cut-out starts from about 70% of the impeller radius towards the high pressure side of the impeller (e.g., a bottom edge of the cut-out is positioned approximately 70% of the distance from the hub to the outer circumferential edge of the impeller.

FIG. 4 schematically shows a portion of the partial back plate 952 with a C-shaped cut out section 954, attached to the shaft hub 950. The cut-out section is bordered by impeller blades (not shown). As a mass of fluid is accelerated along the partial back plate 952, a high pressure area $P_{a1}$ develops on the convex side of the adjacent blade, and a low pressure area $P_{a2}$ develops on the on the concave side of another adjacent blade. In the circumferential direction, the C shape cut-out may be located a relatively larger distance away from the concave side than the convex side. Said another way, the bottom-most portion of the C-shaped cut-out may be closer to the convex side of the impeller than the concave side of the impeller. The C-shape cut-outs are able to reduce axial thrust loading without increasing impeller stress. The partial plate described above and illustrated in FIGS. 3 and 4 may reduce the axial thrust loading of a centrifugal compressor by 50% compared to a conventional compressor.

FIG. 5 shows the pressure generated at the back-face of a compressor with a partial back plate. The compressor 901 with the partial back plate 952 is mounted on the turbine shaft 904. The compressor 901 generates net force $F_c$. An axial turbine 960 is also mounted on the turbine shaft 904 generating net force $F_t$. The total axial load $F_a$ is determined by the force $F_c$ generated by the compressor and the force $F_t$ generated by the turbine, as described in FIG. 2. The force Fc3 generated at the compressor back-face 906a is a function of compressor back-face area A and compressor back-face pressure P (Fc3=P*A). In an impeller with the partial back plate 952, the back-face area A is reduced due to the partial back plate. Also, the pressure P at the compressor back-face 906a will be reduced as the partial back plate 952 can connect to the impeller front at a location with lower radius, thereby dissipating the force $F_{c3}$ from the back-face of the impeller 906*a* to the front of the impeller. Thus, the resulting axial load $F_a$ is reduced due to the decrease in the force $F_{c3}$, and hence the net force $F_c$ generated by the compressor. In one example, to improve transient response time, the compressor 901 with the partial back plate 952 may be mounted in combination with an electric supercharger which generates very small axial load, such that the reduced $F_{c3}$ of the compressor is balanced by the low axial load of the electric supercharger, thereby reducing total axial thrust load $F_a$ and preventing friction loss.

FIG. 6 shows an example of the turbocharger system with the compressor 901 with the partial back plate 952 and a high pressure outlet/volute 972. A passage 970 connects and introduces the high pressure from the outlet 972 into a chamber 973 in the center housing. A small rotating disk 974, for example a sealing ring already present on the shaft, may be mounted in the chamber to introduce a counter force $F_{c4}$ in direction d1, opposite to the force $F_{c3}$ at the back-face of the compressor 906*a*, resulting in reduction of force $F_{c3}$ generated at the back-face of the compressor 901. The compressor may be mounted in combination with an axial turbine 960 generating a small axial load $F_t$. The axial load $F_a$ on the shaft will thus be determined by the reduced force Fc generated by the compressor 901 and the small turbine force $F_t$ produced by the axial turbine 960. Thus, the reduction of force $F_c$ generated by the compressor balances the low force $F_t$ generated by the axial turbine, reducing unbalanced axial thrust load $F_a$ on the shaft and improving transient response time.

In another example, a compressor impeller with small holes connecting the back-face of the compressor to the front of the compressor may be mounted on a shaft in combination with a turbine or an electric motor, as shown in FIG. 7. The compressor impeller 906 has a plurality of through holes 975 at the low radius region of the impeller, connecting the back-face of the impeller 906*a* to the front-face 906*b* of the impeller, thereby dissipating the force $F_{c3}$ generated at the back-face of the impeller 906*a* and reducing the net thrust/force $F_c$ generated by the compressor 901. The holes 975 are located at a low radius region of the impeller and not at the larger radius region near the impeller outlet. The pressure generated at the back-face of the impeller is directly proportional to the radius of the impeller. The through holes at the low radius of the impeller dissipate just enough pressure from the back-face so that the pressure at back-face of the impeller is almost counterbalanced by the pressure at the front-face of the impeller. The number, size, and location of holes 975 may be calculated to allow a predetermined amount of pressure to pass from the back-face of the impeller 906*a* to the front-face of the impeller 906*b*. In one embodiment, the holes 975 may be equally spaced around the impeller radius. In another example, the holes 975 may be unequally spaced around the impeller. The electric motor 980 produces a small axial load Fe which in combination with net force $F_c$ generated by the compressor 901, will reduce the axial load $F_a$ on the shaft 904.

The above described embodiments of the compressor may be used alone or in combination. For example, the compressor impeller may include a plurality of cut-out sections, as shown in FIG. 3, in combination with the high-pressure relief passage of FIG. 6 and/or with the plurality of through-holes of FIG. 7. Further, one or more of above-described compressors may be included with one or more embodiments described in the figures below to reduce the axial thrust load on the turbine shaft in a turbocharger system.

As previously described, turbochargers are used in engines to increase the charge air density and allow more engine power to be produced for a given engine displacement. However, one problem frequently associated with turbocharged engine systems is turbocharger lag, which is a delay in turbocharger system responding to the demand for increased power by the engine. The delay in turbocharger response is enhanced by unfavorable turbocharger compressor characteristics, including high compressor load and slow turbine speed. To overcome the turbocharger lag and to improve transient response time, a regenerative hydraulic assisted turbocharger system in combination with the conventional turbocharger system may be used. The regenerative hydraulic system may include one or more turbo pumps and/or hydraulic turbines mounted on the turbine shaft of a conventional turbocharger system, between the conventional compressor and the conventional turbine. However, the generation of excessive force at the back-face of the additional pump and/or the additional turbine of the regenerative system may also contribute to increased axial thrust loading of the shaft and can damage the associated seals.

FIG. 8 shows the engine 10 of FIG. 1 connected to a conventional turbocharger system and to an additional regenerative hydraulic assisted turbocharger system. The turbocharger system comprises of the turbo compressor 60 and the turbine 62 mounted on a turbine shaft 160, as described in FIG. 1. The turbine 62 receives exhaust gas from the engine 10 through passage 15*a* and the turbo compressor 60 is coupled to the engine by passage 15*b*, the arrows indicating the direction of airflow. The turbocharger system described in FIG. 1 is coupled to an additional hydraulically driven turbo system 22, comprising a turbo pump 22*a* and hydraulic turbine 22*b* mounted on the same turbine shaft 160, between the turbine 62 and the compressor 60.

Upon increased demand for engine torque, based on engine operating parameters such as high engine load, increased speed etc., the turbocharger system provides compressed air to the engine to increase engine air density, which translates to increased torque. In a conventional turbocharger system, the exhaust gas from the engine 10 is transported through passage 15*a* to the turbine 62. The gas from the exhaust passes through the turbine wheel and imparts rotational momentum to the shaft 160, which rotates at high speed driving the coupled compressor 60 to compress the inlet air and deliver highly pressurized air through passage 15*b* to the engine.

In one example, the transient response of a conventional turbocharger system may be increased by the additional turbine system 22. The turbine system 22 can convert the excess kinetic energy generated during the rotation of the turbine shaft 160 and store the converted energy to meet subsequent demands for increase in engine torque without increasing the turbocharger lag time. The turbo pump 22*a* may be connected to the engine 10 to receive hydraulic fluid, such as engine oil. The turbo pump 22*a* compresses the hydraulic fluid. The turbo pump 22*a* is also connected to a high pressure tank 29 to store the compressed hydraulic fluid. The high pressure tank 29 can transfer the compressed fluid to the connected hydraulic turbine 22*b*, which is driven via the energy of the compressed fluid. The rotational energy generated by the hydraulic turbine 22*b* is transferred to the engine 10 via rotation of the turbine shaft, which assists in the compression of the intake air via the compressor. An example of the turbo system 22 assisting in acceleration and deceleration response of a conventional turbocharger system is described below. The turbo charger system 22 may have one or more than one hydraulically driven pump and/or turbine mounted on the shaft 160.

An electric control unit (ECU) 3, which may be one non-limiting example of the electric controller of FIG. 1, regulates the flow of fluid to the mounted turbine pump 22a and the mounted hydraulic turbine 22b, thereby regulating the acceleration and deceleration response of the turbocharger depending on engine operating parameters. For example, upon a command for engine acceleration, the ECU 3 closes electrically actuated valve 28a and opens electrically actuated valve 28b, thereby hydraulic fluid such as engine oil, passes from the high pressure tank 29 to the mounted hydraulic turbine 22b. In one example, the turbine 22b may receive high pressure hydraulic fluid through a pump driven by the engine (e.g., a coolant pump). In another example, an engine driven hydraulically powered electric generator can supply energy to charge an inverter/battery. A hydraulic fluid pump powered by the inverter/battery can supply high pressure hydraulic fluid to the turbine 22b. In such examples, the turbo pump mounted to the shaft may be dispensed with. The force of the high pressure fluid impinging on the turbine 22b enhances the angular rotation of the shaft 160. This increase in rotational momentum of the turbocharger shaft 160 by the hydraulic fluid hitting the hydraulic turbine 22b is translated to additional torque and subsequent engine acceleration.

In another example, upon a deceleration signal, the ECU 3 opens valve 28a and closes valve 28b allowing low pressure hydraulic fluid from the engine 10 to impinge on the blades/vanes (not shown) of the turbo pump 22a, rotating the blades resulting in pressurization of the hydraulic fluid. This results in generation of a small torque in the counter-clockwise direction, opposite to the clockwise rotation of the turbine shaft 160 driven by the conventional turbocharger system, the compressor 60 and the turbine 62. This results in decrease of angular rotation rate of the shaft 160, thereby decreasing the torque available to the engine, resulting in vehicle deceleration. The pressurized hydraulic fluid then passes to the high pressure tank 29 where it is stored for subsequent acceleration events.

The pressure generated in the back-face of the hydraulic turbine and the back-face of the turbo pump may be higher than the front-face of the turbine or the turbo pump due to the larger area of the back-face, which contributes to higher force generation, as illustrated in FIG. 2. Furthermore, the high pressure at the turbo pump outlet and the turbine inlet can damage the seals, resulting in leaking of hydraulic fluid from the sealed center housing.

Additionally, in a conventional turbocharger system the compressor and the turbine are pressurized at the same time (e.g., exhaust flows over the turbine at the same time intake air flows over the compressor). Thus, the thrust load generated by the compressor and the turbine is generally balanced and the resulting thrust on the bearing system may be adequately contained by the thrust bearings. However, with the additional hydraulic turbine system on the turbine shaft of the conventional turbocharger system, the turbo pump and the hydraulic turbine work independently at different times. In one example, the turbo pump is pressurized when there is a need for deceleration while the hydraulic turbine is pressurized by the hydraulic fluid from a high pressure tank when acceleration is required. Thus, the thrust load generated by the additional turbo pump or by the additional turbine is unbalanced and is significantly higher than load generated by the conventional turbocharger system with one compressor and one turbine. To mitigate the problem of unbalanced thrust loading and to decrease the pressure on the seal at the back-face of the mounted wheels, a regenerative hydraulic turbocharger system with a back-to-back turbo pump and a back-to back-turbine is described below with respect to FIGS. 9-14.

FIGS. 9-14 illustrate a turbocharger system with an additional turbo pump and/or hydraulic turbine mounted on a conventional turbine shaft, where the additional turbo pump is a back-to-back turbo pump and the additional turbine is a back-to-back hydraulic turbine. In a back-to-back turbo pump, two impellers are mounted on a turbine shaft such that the first impeller front-faces in a first direction and the second impeller front-faces towards a second direction, opposite to the first direction while the back-faces of the two impellers face each other. Similarly, in a back-to-back turbine the back-face of a first turbine wheel faces the back-face of a second turbine wheel.

FIG. 9 shows a schematic of a turbine shaft 306 along its longitudinal axis 350 with a back-to-back turbo pump 302 and a back-to-back hydraulic turbine 304 mounted on the turbine shaft 306. The turbine shaft 306 rotates along the rotational axis 354. The back-to-back turbo pump 302 is encased in a turbo pump housing 316. The back-to-back turbo pump 302 has back-to-back impellers 311a and 311b with the impeller 311a facing a first direction 320 and the impeller 311b towards a second direction 322, opposite to the first direction. The turbine shaft 306 has seals 310 adjoining the mounted back-to-back turbo pump 302 and back-to-back hydraulic turbine 304. The shaft 306 is enclosed in a center housing 321 that receives high pressure hydraulic fluid, for example engine oil. As the shaft 306 rotates at high speeds, the seals 310 prevent the high pressure fluid from leaking and exiting through the center housing 321. In one example, the seal 310 may be a labyrinth seal on the turbine shaft 308 providing non-contact sealing action by controlling the passage of fluid through a variety of chambers by centrifugal motion, as well as by the formation of controlled fluid vortices. Thrust bearings 315 mounted on the shaft 306 are shown adjacent to the back-to-back turbo pump 302 and adjacent to the back-to-back turbine 304 to help absorb the axial thrust load generated on the turbine shaft 306. The back-to-back hydraulic turbine 304 mounted on the turbine shaft 306 has a plurality of radiating rotary blades 314, and is encased in a turbine housing 317. The rotary blades 314 have a flat back side and an angled side (not shown). In a back-to-back turbine 304, the rotary blades are arranged such that a first set of rotary blades have an angled surface that angles towards a first direction and the second set of rotary blades have an angled surface that angles towards a second direction, opposite to the first direction.

FIGS. 10 and 11 show an example of a back-to-back impeller. FIG. 10 shows a side view 400 of the back-to-back impellers 311a and impeller 311b. The radiating blades 312a in a first direction 320 are arranged on a back plate 406a of the impeller 311a and radiating blades 312b in a second direction 322 are arranged on the back plate 406b of the impeller 311b. FIG. 11 shows the front view of impeller 311a with a central shaft hub 502. The impeller blades 312a are radiating out of the central shaft hub 502. The curved edge of the blades 312a and 312b form diffuser vanes 504. The curved edge sweeps across the wall of the turbo pump housing 316, between the pump inlet and diffuser, as shown in FIG. 12. In one example, guide vanes may be present at the inlet/infuser region of the turbo pump.

FIG. 12 shows a single volute back-to-back impeller assembly 600 with dual inlets, configured to reduce the pressure on the turbine shaft. Back-to-back impellers 311a and 311b mounted on the turbine shaft 306, receive low pressure fluid through inlets 604 and 604', respectively. The direction of fluid at the inlets is marked by flow path 8 and 8'. The fluid impinging on the impeller blades 312a and 312b (not visible) imparts rotational momentum to the radiating blades of the back-to-back impellers 311a and 311b, resulting in compression of the fluid. The pressurized fluid is discharged through a single volute 606 along flow path 9, away from the turbine shaft 306. Thus, the configuration of the back-to-back impeller assembly 600 prevents the turbine shaft 306 from being exposed to the high pressure fluid in the discharge volute. The flow rate of fluid through the back-to-back impeller may be adjusted by using a full or partial admission impeller and/or a full or partial emission impeller. Orientation of guide vanes in the infuser and in the diffuser of the impeller may be used to regulate admission and emission flow rates, respectively.

FIG. 13 shows a turbine shaft 715 along its longitudinal axis 750 with a back-to-back turbo pump 702 mounted on the turbine shaft 715. The back-to-back turbo pump 702 has back-to-back impellers 711a and 711b with the impeller 711a facing a first direction 320 and the impeller 711b towards a second direction 322, opposite to the first direction. Sealing 710 associated with the turbine shaft 715 is present adjoining the front-face of the impeller 711b. The back-to-back turbo pump 702 with impeller blades 712a attached to the impeller 711a back plate 706a and impeller blades 712b attached to the impeller 711b back plate 406b is encased in the turbine pump housing 716. Dual inlets bring in low pressure fluid along flow path 704a and 704b to the back-to-back turbo pump 702. In the back-to-back turbo pump 702, the back plates 706a and 706b face each other, away from the shaft sealing 710, thereby exposing the sealing 710 to low pressure, reducing parasitic loss of the sealing 710. The shaft 715 is not exposed to the high pressure of the fluid at the discharge outlet resulting in decreased axial thrust load on the shaft 715. Furthermore, in the back-to-back turbo pump, the force generated at the back-face of one wheel will be counterbalanced by the force generated at the back-face of the second wheel, self-balancing the thrust load on the turbine shaft, reducing the associated friction loss of the thrust bearings.

Similarly, the use of back-to-back hydraulic turbine (the back-face of a first turbine faces the back-face of the second turbine) allows the sealing to be positioned away from the high pressure area, and also results in counterbalancing of force on the back-face of the back-to-back turbines, reducing friction loss of the sealing and the thrust bearings mounted on the turbine shaft. FIG. 14 shows a turbine shaft 815 along its longitudinal axis 850 with a back-to-back hydraulic turbine 802 mounted on the turbine shaft 815. The back-to-back hydraulic turbine 802 has back-to-back rotating blades 811a and 811b, with the blades 811a facing a first direction 320 and the blades 811b towards a second direction 322 opposite to the first direction 320. Sealing 810 associated with the turbine shaft 815 is present adjoining the blades 811a of the back-to-back hydraulic turbine 802. The back-to-back hydraulic turbine 802 may be encased in the turbine housing 816. A single inlet brings in high pressure fluid along flow path 804 to the back-to-back hydraulic turbine 802. The high pressure fluid received by the back-to-back hydraulic turbine 802 may be hydraulic fluid such as engine oil. In one example, the back-to-back hydraulic turbine 802 may receive the hydraulic fluid from a high pressure tank connected to the turbine. In another example, the back-to-back hydraulic turbine 802 may receive high pressure hydraulic fluid through an engine driven pump. A high pressure area 820 may be present at the inlet of the back-to-back turbine 802. As the high pressure fluid impinges the rotary blades 811a and 811b, the kinetic energy of the high pressure fluid is depleted and the fluid exits through two outlets along low pressure flow paths 814a and 814b, along the turbine shaft 815. A sealing 810 associated with the turbine housing 816 adjoining the back-back hydraulic turbine 802 is located away from the high pressure area 820, as illustrated in FIG. 14. Thus, the sealing 810 is not exposed to the high pressure at the back-to-back turbine 802 inlet. The turbine shaft 815 is exposed to the low pressure fluid exiting along flow paths 814a and 814b, resulting in reduced axial thrust load on the turbine shaft 815 and the associated bearings, reducing the parasitic loss of the bearings.

Thus, a regenerative hydraulic assisted back-to-back turbo pump and/or a back-to-back hydraulic turbine mounted on a common turbine shaft with a conventional compressor and turbine, can reduce the pressure on the sealing of the turbine shaft and generate balanced thrust load on the turbine shaft. A compressor with reduced back plate area and with reduced back plate pressure (described in FIGS. 2-7) can be mounted instead of a traditional compressor in combination with the regenerative hydraulic assisted turbocharger system, further reducing the axial thrust load on the turbine shaft. An axial turbine or an electric supercharger in combination with the partial back plate compressor and the regenerative turbocharger system can further reduce axial thrust load and decrease turbocharger lag.

The technical effect of using a compressor with partial back plate, alone or in combination with a passageway connecting and diverting high pressure to a chamber in a center housing of a turbine, and/or with through holes connecting the back-face of the compressor to the front-face of the compressor, decreases the pressure at the back-face of the compressor and reduces the axial thrust load on the turbine shaft. The reduction of axial thrust load generated by the abovementioned compressor allows it to be paired with an axial turbine or an electric supercharger to improve transient response time of a turbocharger. The use of additional back-to-back turbo pump and/or back-to-back turbine in a regenerative turbocharger, prevents the seals on the turbine shaft from being exposed to the high pressure on the back-face of the additional turbo pump and turbine wheels and balances the thrust load generated by the back-to-back wheels, decreasing friction loss of the seal and the thrust bearing system.

A turbocharger system comprises a centrifugal compressor including an impeller having a plurality of radiating blades coupled to a partial back plate, the partial back plate comprising a plurality of cut-out sections, each cut-out section located between two respective radiating blades on outer circumference of the impeller. It further comprises a driver, and a shaft coupling the compressor to the driver. In a first example of the turbocharger system, the driver comprises a turbine. A second example of the turbocharger system optionally includes the first example and further includes wherein the driver comprises an electric motor. A third example of the turbocharger system optionally includes one or both of the first and second examples and further includes wherein the turbine is an axial turbine. A fourth example of the turbocharger system optionally includes one or more or each of the first through third examples and further includes a passage connecting an outlet of the compressor to a chamber in a center housing of the turbine shaft and a rotating disk located inside the chamber in the center housing of the compressor. A fifth example of the turbocharger system optionally includes one or more or each of the first through fourth examples and further includes wherein the rotating disc in the chamber is a sealing ring. A sixth example of the turbocharger system optionally includes one or more or each of the first through fifth examples and further includes wherein the impeller has a plurality of through-holes connecting a back-face of the impeller to a front-face of the compressor. A seventh example of the turbocharger system optionally includes one or more or each of the first through sixth examples and further includes wherein the radiating blades of the compressor impeller are full blades. An eighth example of the turbocharger system optionally includes one or more or each of the first through seventh examples and further includes wherein the radiating blades of the compressor impeller are splitter blades.

An embodiment of a regenerative turbocharger system of an internal combustion engine comprises a back-to-back turbo pump with a back of a first impeller facing a back of a second impeller, a hydraulic turbine, a compressor; a turbine; and a common turbine shaft, with the back-to-back turbo pump, the hydraulic turbine, the compressor, and the turbine all mounted on the turbine shaft. In a first example of the regenerative turbocharger system, the back-to-back turbo pump has dual inlets and a single common volute discharge outlet. A second example of the regenerative turbocharger system optionally includes the first example and further includes wherein the back-to-back turbo pump compresses hydraulic fluid received from the engine and connects to a high pressure tank to store the compressed hydraulic fluid. A third example of the regenerative turbocharger system optionally includes one or both of the first and second examples and further includes the hydraulic turbine is a back-to-back hydraulic turbine. A fourth example of the regenerative turbocharger system optionally includes one or more or each of the first through third examples and further includes the back-to-back hydraulic turbine has a single inlet receiving hydraulic fluid compressed by the back-to-back turbo pump and has dual discharge ports.

In another embodiment, a regenerative turbocharger system of an internal combustion engine comprises of a partial back plate compressor, a back-to-back hydraulic turbine comprising two turbine rotors coupled back-to-back, a turbine, and a common turbine shaft. The back-to-back hydraulic turbine, the partial back plate compressor, and the turbine are each mounted on the common turbine shaft. In a first example of the regenerative turbocharger system, the back-to-back hydraulic turbine receives hydraulic fluid compressed by an engine-driven hydraulic pump. A second example of the regenerative turbocharger system optionally includes the first example and further includes a back-to-back turbo pump mounted on the turbine shaft, wherein the back-to-back turbo pump is a hydraulically driven pump receiving hydraulic fluid from the engine and connecting to a high pressure hydraulic fluid tank. A third example of the regenerative turbocharger system optionally includes one or more or each of the first and second examples and further includes the high pressure hydraulic fluid tank is fluidically coupled to the back-to-back hydraulic turbine. A fourth example of the regenerative turbocharger system optionally includes one or more or each of the first through third examples and further includes the partial back plate compressor comprises an impeller having a back plate with a plurality of cut-out sections distributed along an outer circumferential edge of the impeller.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein. The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A regenerative turbocharger system of an internal combustion engine, comprising:
 a partial back plate compressor;
 a back-to-back hydraulic turbine comprising two turbine rotors coupled back-to-back;
 a turbine;
 a back-to-back turbo pump;
 a common turbine shaft, the back-to-back hydraulic turbine, the partial back plate compressor, the back-to-back turbo pump, and the turbine each mounted on the common turbine shaft; and
 a seal positioned between a housing of the back-to-back hydraulic turbine and the common turbine shaft at a location spaced away from a high pressure area adjacent to a plurality of back-to-back rotary blades and an inlet in the back-to-back hydraulic turbine.

2. The regenerative turbocharger system of claim 1, wherein the back-to-back hydraulic turbine receives hydraulic fluid compressed by an engine-driven hydraulic pump.

3. The regenerative turbocharger system of claim 1, wherein the back-to-back turbo pump is a hydraulically driven pump receiving hydraulic fluid from the internal combustion engine and connecting to a high pressure hydraulic fluid tank.

4. The regenerative turbocharger system of claim 3, wherein the high pressure hydraulic fluid tank is fluidically coupled to the back-to-back hydraulic turbine.

5. The regenerative turbocharger system of claim 1, wherein the partial back plate compressor comprises an impeller having a back plate with a plurality of cut-out sections distributed along an outer circumferential edge of the impeller.

\* \* \* \* \*